United States Patent
Fink

[11] 3,768,274
[45] Oct. 30, 1973

[54] SYSTEM FOR CONTROLLING COOLING AND HEATING OF A LOADING SPACE

[75] Inventor: James K. Fink, Lakeland, Fla.

[73] Assignee: Fruit Growers Express Company, Washington, D.C.

[22] Filed: Aug. 28, 1972

[21] Appl. No.: 284,174

[52] U.S. Cl............... 62/159, 62/160, 62/324, 62/239
[51] Int. Cl............................................ F25b 29/00
[58] Field of Search..................... 52/159, 160, 324

[56] References Cited
UNITED STATES PATENTS

| | | | |
|---|---|---|---|
| 2,677,243 | 5/1954 | Tilkes | 62/160 |
| 2,725,724 | 12/1955 | Rosen | 62/160 |
| 2,771,748 | 11/1956 | Prosek | 62/160 |
| 2,959,933 | 11/1960 | Burke | 62/324 |
| 2,992,541 | 7/1961 | Sutton | 62/324 |
| 3,190,079 | 6/1965 | Lauer | 62/324 |
| 3,365,902 | 1/1968 | Nussbaum | 62/160 |

*Primary Examiner*—William J. Wye
*Attorney*—Robert S. Auten et al.

[57] ABSTRACT

Refrigeration apparatus operating in a cooling cycle as well as a heating cycle for delivering cooled or heated air from an evaporator to a loading space and permitting a direct delivery of a portion of the hot gas from a compressor to the evaporator during selected periods of both cooling and heating cycles. A bypass valve system disposed between the compressor and evaporator is under the control of a thermostat unit, sensing the temperature of the air and when open permits the flow of the portion of hot gas.

5 Claims, 4 Drawing Figures

PATENTED OCT 30 1973　　　　　　　　　　　3,768,274

SYSTEM FOR CONTROLLING COOLING AND HEATING OF A LOADING SPACE

BACKGROUND OF THE INVENTION

This invention relates to means for controlling the operation of refrigeration apparatus used in vehicles, such as semi-trailers or mechanical refrigerator cars, so as to more effectively control the temperature of the air which is delivered to the loading space in the vehicle.

Presently used refrigeration apparatus, which is designed to provide a controlled temperature within a loading space in a vehicle, is conventionally carried on the vehicle and generally the refrigeration apparatus operates according to the vaopr-compression cycle. This type of apparatus employs a compressor which delivers hot gas to a condenser where the gas is cooled to a liquid form for delivery through an expansion valve, to an evaporator and the gas flowing out of the evaporator is then returned to the compressor. In such installations a fan forces air through the evaporator and through a discharge opening generally located near the ceiling of the vehicle, into the loading space of the vehicle. The air passes over and down through the load carried in this space and then returns, in most cases along the floor of the vehicle, to the inlet side of the fan.

In order to control the temperature of the air delivered to the loading space and the load it is also conventional to provide a thermostat unit having a sensor which is disposed in the path of the return air flow to the evaporator within the vehicle. This thermostat unit is set to maintain a desired temperature, as measured at the sensor, and operates, through suitable switches in the unit, to regulate the speed of an engine or motor operating the compressor. The unit also operates to control a valve system, such as a solenoid operated three-way valve, to regulate the cooling or heating of the circulating air as it passes through the evaporator. The valve system operates under the control of the thermostat to permit either a delivery of high pressure liquid from the condenser to the expansion valve and the evaporator in a cooling cycle in which the air flowing through the evaporator is cooled, or to permit a delivery of hot gas directly from the compressor to the evaporator in a heating cycle so that air flowing through the evaporator is heated.

The above-described type of control system operates in a repetitive series of cooling-heating cycles to maintain the temperature of the air being returned from the load in the vehicle near the desired temperature set at the thermostat unit. For example, if it is desired to maintain a set point temperature of 32° for a particular load which, when loaded in the vehicle was at a temperature of say 62°, the refrigeration apparatus, under direction of its control system, operates with the compressor running at a high speed, in a cooling cycle for the time necessary to reduce the return air temperature in the loading space of the vehicle down toward this set point. In normal operation when the temperature of the air being returned from the loading space reaches the set point temperature, a first switch in the thermostat unit closes and actuates suitable control means to cause the prime mpver for the compressor to run at a lower speed. When this occurs the air passing through the evaporator is still cooled, but at a reduced rate, until the air being returned to the evaporator reaches the set point of the thermostat which is 32°. At this time the solenoid of the three-way valve is actuated by a second switch at the thermostat unit and the valve switches over to deliver hot gas to the evaporator for a heating cycle of the air flowing through this evaporator. This heating cycle also takes place at the low speed of the compressor so that the temperature of the air being returned from the loading space is gradually raised 2° above the set point temperature. At this temperature the three-way valve is again actuated by the second switch of the thermostat unit so as to again initiate a cooling cycle. The cooling cycle continues until the temperature of the air is again brought down to the 32° point which is the set point. At this point the heating cycle is again repeated and this sequence of operations continues in repetitive cycles of heating and cooling the air as it passes through the evaporator.

In the above described arrangement the sensor of the thermostat unit is disposed to sense the temperature of the air returned from the loading space after it has been drawn, by the fan, through this loading space and downward over any load in this space.

In the use of the refrigeration system described above there are problems which arise, in part because of the relatively rapid switching of the apparatus between cooling and heating cycle and also because of the top air delivery of the air to the loading space.

Experience has shown that in the use of the top air delivery systems, as described above, there are serious deficiencies and particularly in those situations where the load is an agricultural product such as fruits or vegetables. Here it is essential that these products be cooled in a proper manner in order to maintain them at a proper quality and in a condition for marketing. This involves the use of a system in which the load, and particularly a load which is not precooled, can be cooled down at a desired rate and can achieve a uniform temperature in the load. The top air delivery system, operating under the above described control of cooling and heating cycles, is not completely satisfactory in this area.

It appears that the top air delivery system is dependent upon the inlet pressure of the fan drawing the air which is cooled or heated through the load. This necessitates the use of complex stacking patterns, special designs for the containers in which the load is carried and providing for additional room around the load so that the air can circulate. Because of these factors air distribution in this type of system is generally not uniform inside the laoding space.

As an additional factor loading requirements for the top air delivery system must provide for a set back area at the rear door of a vehicle such as a semi-trailer to assure air movement around and through the load. Because the load must be positioned away from the rear door of the trailer or car the load requires additional bracing to prevent shifting of the load during transit.

It has also been found that the first 50 hours in which a non-precooled load is in a refrigerated space in a transport vehicle are the most critical of any time during the transport period. It is during this period of time that heat of respiration and total specific heat of the product load being carried can induce a premature ripening cycle, or excessive heat build-up in the load can cause tissue breakdown and start decay. It is therefore essential the refrigerated air be quickly circulated through the product after it has been loaded in order to achieve an immediate reduction in the commodity temperature.

With respect to precooled commodities, the rapid changes in air temperature which are prevalent in overhead delivery systems exceeds the dewpoint and continues to dehydrate the commodity. Since there has been a reduction in the moisture in the air due to the lowered temperature the product gives up its moisture to the drier air.

SUMMARY OF THE INVENTION

It is therefore the object of the invention to provide a control system for refrigeration apparatus for vehicles which will function to maintain the temperature of the air delivered from the evaporator of the apparatus in a bottom air delivery system to a load in the loading space of a vehicle without rapid changes between heating and cooling cycles and thereby avoid the above-described disadvantages occasioned by such changes.

This is accomplished according to the present invention by providing a by-pass valve system in association with the three-way valve used in the conventional type of refrigeration apparatus. With such a system it has been found too that better control of the temperature of the air flowing into the loading space can be achieved by positioning the sensor of the thermostat unit at the discharge side of the evaporator, instead of at the return side as is generally conventional, and by providing for bottom delivery of air to the loading space.

The by-pass valve, which also can be a solenoid operated valve, is actuated by electrical signals from a switch in the thermostat unit and is disposed in a hot gas line extending between the compressor and the evaporator of the apparatus. When the temperature of the air being delivered to a load has been brought down to the set point temperature, as sensed by the thermostat sensor in the flow path of the air being delivered from the evaporator, the thermostat unit acts, through a first switch to energize the solenoid at the by-pass valve and a portion of the hot gas being delivered by the compressor is sent directly to the evaporator. Meanwhile the three-way valve remains in its position for a cooling cycle at the evaporator and continues to deliver high pressure liquid to the expansion valve and the evaporator. The direct delivery of hot gas from the compressor to the evaporator, through the by-pass valve, raises the pressure in the evaporator and drives part of the liquid out of the evaporator. This reduces the ability of the evaporator to remove heat from the air flowing through the evaporator and into the loading space of the vehicle. With this arrangement the temperature of the air being delivered can be made to drop very slowly in the temperature range between the set point and the temperature at which a heating cycle is initiated.

By the time the evaporator drops the delivery air to a predetermined temperature below the set point, for example, 2°, and the unit is shifted through actuation of the three-way valve by another switch in the thermostat unit, to the heat cycle, most of the liquid in the coil of the evaporator has been driven out by the raised pressure. Consequently, the unit slowly raises the delivery air temperature back to the dial setting of the thermostat unit, or the set point. During this period both the three-way valve and the by-pass valve are open to deliver hot gas directly to the evaporator.

At the set point temperature the three-way valve is actuated by the second switch in the thermostat unit to move it to its cooling cycle position but the by-pass valve remains open to continue the delivery of a portion of the hot gas to the evaporator. Thus, the cooling cycle is tempered, in a manner as described above, as the temperature of the air continues to rise above the set point temperature. At a predetermined temperature above the set point, say 2°, the first switch of the thermostat opens and the by-pass valve is closed. This then permits a full cooling of the air down toward the set point temperature and the above described cycles of cooling and heating continue in sequence.

The above described arrangement prevents the relatively rapid changing back and forth between heating and cooling cycles and thus permits the delivery of air to the loading space at a more constant temperature over relatively long periods of time. It is this more stable air temperature that tends to prevent dehydration of a commodity carried in the loading space. Since the temperature of the air being delivered to the loading space is controlled the temperature of the return air gradually reaches the temperature of the delivery air as the commodity temperature is reduced. This permits the establishment of a stable condition in the loading space and the temperature spread of return and discharge air does not reach a spread great enough to reach the dew point. Therefore, there will be little further reduction in humidity inside the loading space. This tends to prevent dehydration of the commodity carried by the vehicle.

Another important advantage which is achieved according to the invention is that no provision need be made for both low speed and high speed operation of the compressor in the apparatus. This is possible because the cooling of the air within the range between the set point and predetermined temperatures below and above the set point is accomplished at a greatly reduced rate. It will be appreciated that the apparatus can then be operated more efficiently and with less maintenance if the compressor prime mover is not required to move between high and low speeds but can be run at a relatively constant speed.

DESCRIPTION OF THE PREFERRED EMBODIMENTS

Figure 1:
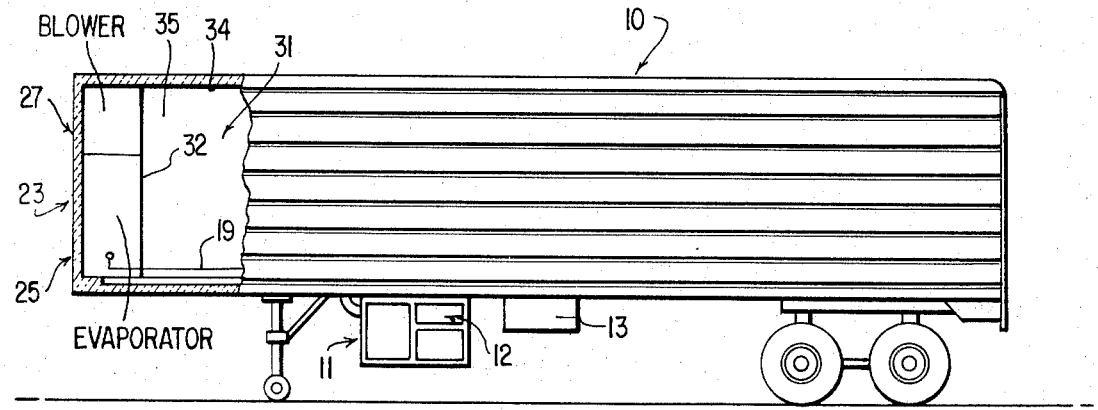
FIG. 1 is a side elevational view of a semi-trailer with refrigeration apparatus which is controlled according to the invention and showing a part of the sidewall broken away to indicate the location of the evaporator-blower section of the apparatus.

As seen in FIG. 1, a conventional semi-trailer 10 having insulated walls is equipped with suitable refrigeration apparatus for cooling a load, not shown, carried in the semi-trailer. There are a number of commerical firms produciing apparatus for such use. As this invention is directed to a control system which can be adapted for use with any of these commercial available systems that operate according to the vapor-compression cycle, the apparatus itself will not be described in detail. As an example of refrigeration apparatus which can be controlled according to the invention, mention can be made of the TLE evaporator type, Model M-5, manufactured by the Thermo-King Company of Minneapolis, Minn.

The refrigeration apparatus mounted on the semi-trailer 10 includes a power unit, generally indicated at 11, mounted beneath the body of the semi-trailer, and a suitable control panel, generally indicated at 12. A fuel tank 13 for the prime mover, not shown, in the power unit 11 is separately mounted beneath the semi-trailer. It is believed sufficient to say at this point that this power unit 11 includes, as seen in FIG. 4, the compressor 14, condenser 15, receiver 16, and a valve system including the three-way valve 17 and the bypass valve 18 as provided by the invention.

Figure 4:
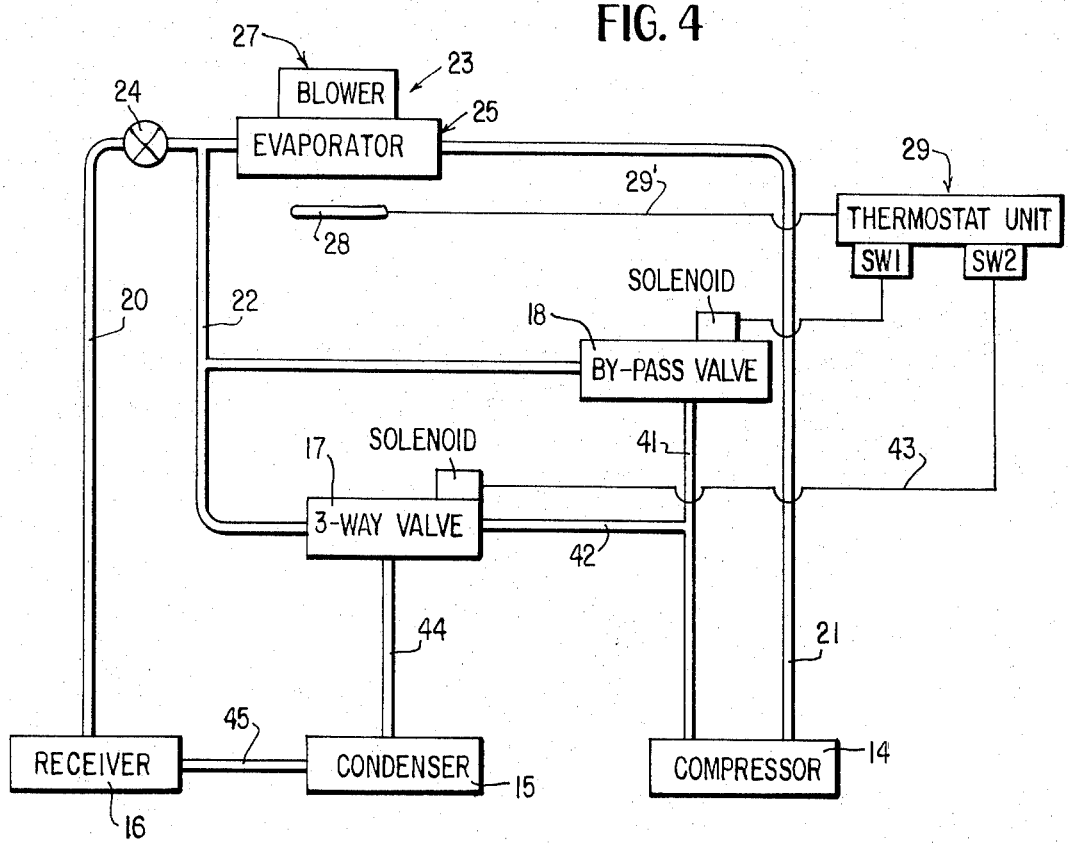
FIG. 4 is a schematic diagram of a refrigeration apparatus used in the semi-trailer and showing the control system for this apparatus according to the invention.

As seen in FIGS. 1 and 4, a conduit 19, which includes a condensed-refrigerant line 20, a return line 21 for the cooling cycle, and a hot gas line 22 for the heating cycle, runs between the power unit 11 and the evaporator-blower section, generally indicated at 23, for connection to expansion valve 24 and evaporator unit 25 in a known manner. In addition, the motor 26 for the blower unit, generally indicated at 27 in FIG. 2, is electrically connected by wires, not shown, with a source of electric power, also not shown, at the power unit 11.

Figure 2:
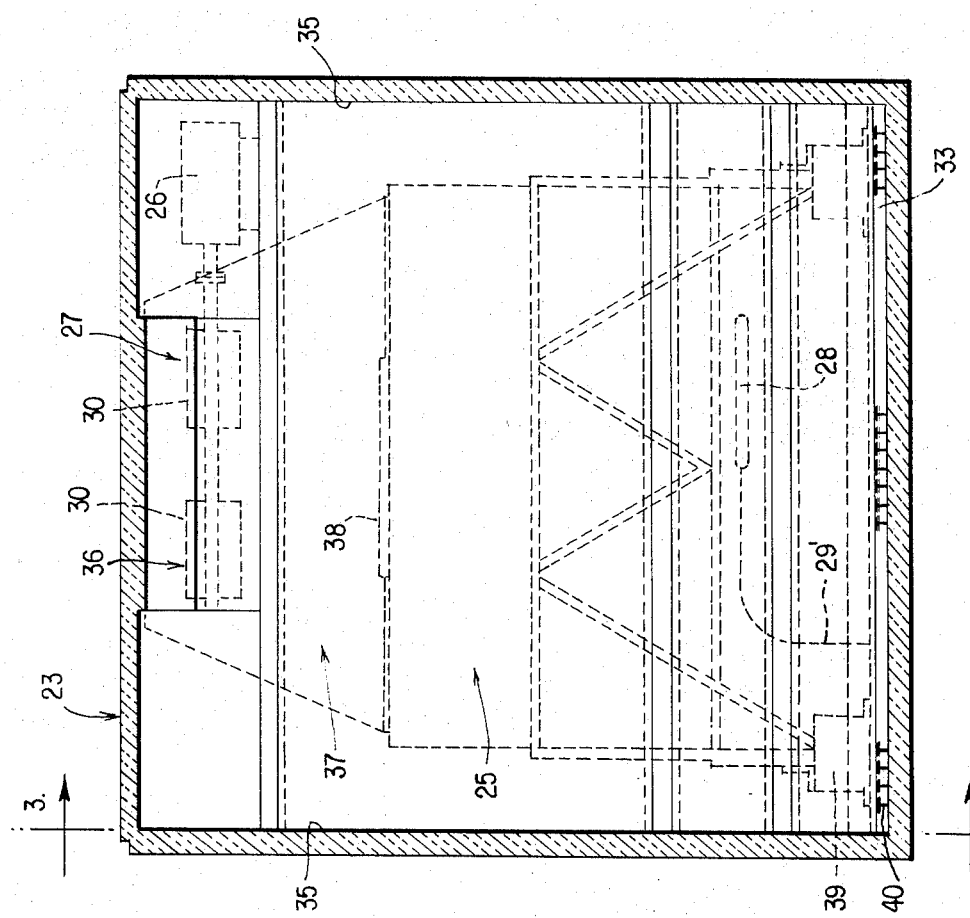
FIG. 2 is a front elevational view looking through the interior of the semi-trailer from the door end and toward the evaporator-blower section and showing this section in more detail.

A sensor bulb 28 disclosed in FIGS. 2 and 4, for a conventional thermostat control system for the refrigeration apparatus is interconnected with the thermostat unit 29 at the control panel 12 by line 29'. It will be noted that bulb 28 is positioned in the path of discharge air as it is blown through the evaporator unit 25 by squirrel-cage blowers 30 driven by the motor 26. This sensor bulb 28 and associated thermostat unit can be of conventional construction, as, for example, a Model DW unit produced by Partlow Company of Utica, N.Y., which is uded in the Thermo-King Model M-5 apparatus mentioned above. Such units conventionally include switches, two of which are shown schematically in FIG. 4 and are designated as SW1 and SW2, and these switches are adapted to open and close electrical circuits in response to temperature conditions as sensed at the sensor 28.

Figure 3:
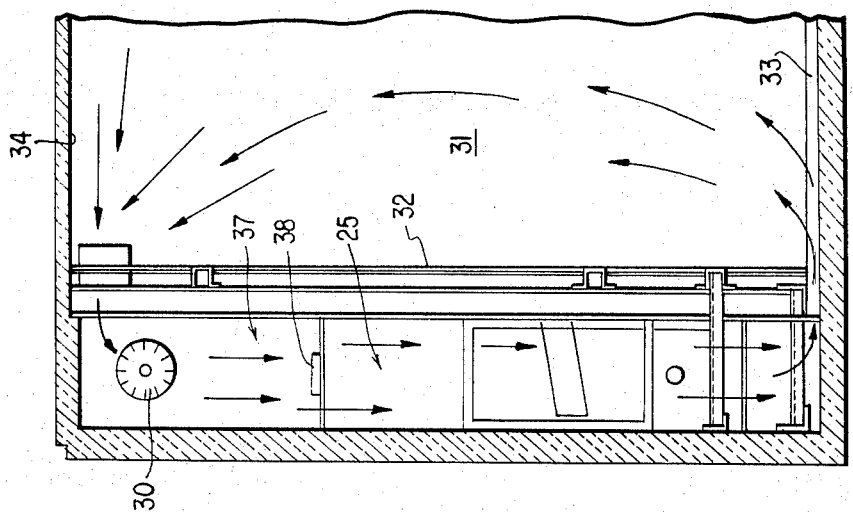
FIG. 3 is a cross-sectional view of the evaporator section taken along the line 3—3 in FIG. 2.

As seen in FIGS. 2 and 3, the evaporator-blower section 23 is separated from the loading space of the vehicle, generally indicated at 31, by a bulkhead 32 extending between the floor 33 and ceiling 34, and between sidewalls 35. An opening in the bulkhead, generally shown at 36, is provided near the ceiling 34, and at the location of the squirrel-cage blowers 30. A plenum chamber, generally indicated at 37, lies below blowers 30 and above the evaporator unit baffle plate 38. The evaporator unit 25 is suitably supported on a frame 39 resting on floor 33. It should be noted that this floor 33 is made up of a number of aluminum extruded T-shaped pieces disposed in generally parallel relationship along the length of the semi-trailer 10 to provide channels 40 with slot-type openings directed into the load space 31.

FIG. 3 shows, by means of the arrows, the airflow produced by the blower unit 27 and it will be seen that, under the impetus of squirrel-cage blowers 30, air is forced downward through the evaporator unit 25, across sensor 28 and into the channels 40 of floor 33. This airflow is such that the air simultaneously flows longitudinally within these channels to the opposite end of the semi-trailer 10 and upward, through the slots in these channels, through the load carried in the space 31, toward the ceiling 34 to return, through openings 36, to the suction side of the blowers 30.

The refrigeration apparatus shown schematically in FIG. 4 operates according to the well known vapor-compression cycle. In the arrangement shown there, hot refrigerant gas from the compressor 14 is passed, through the lines 41 and 42, to the three-way valve 17. This is a conventional solenoid operated valve which operates under electrical command signals sent to it from switch SW2 of thermostat unit 29, via the wire 43, to direct the hot gas flowing in line 42 either to line 44 or to line 22. If the thermostat unit of the system is calling for a cooling cycle, the hot gas is directed to condenser 15 and if the thermostat unit is calling for a heating cycle, the gas is sent directly to the evaporator 25.

On the cooling cycle, the condensed refrigerant passes from condenser 15 through line 45 to receiver 16 and flows to the evaporator 25 through line 20 and expansion valve 24. If a heating cycle is called for by the thermostat unit, the hot gas does not flow to the condenser 15 but instead passes directly through line 22 to the evaporator 25. In either case, of course, the expanded and cooled refrigerant gas returns from evaporator 25 through line 21 to the condenser 14.

With the above-described and previously known arrangement shown in FIG. 4, the thermostat unit tends to maintain a predetermined temperature, or a set point to which the thermostat is set, of the air flowing to the loading space 31 of the trailer 10. As previously mentioned this involves a repetitive cycle of cooling and heating of the air being blown into the loading space by blowers 30. In practice, once the temperature of the load in the loading space 31 has been brought down in a cooling cycle to the set point, say 32°, this cycle is not suddenly terminated but continues in a cooling cycle to lower the temperature of the air until a predetermined temperature below the set point, in a manner previously explained. At this point, the three-way valve 17 is actuated through switch SW2 to cut off the flow of hot gas to condenser 15 and the gas is directed instead to the evaporator 25 for a heating cycle which causes the temperature of the air being returned from the load in the loading space to rise in temperature, as a result of the rise in temperature of the air off the evaporator. When the temperature of the air again reaches the set point temperature, the three-way valve 17 is again actuated, from the control panel, to the cooling cycle setting so gas flows to the condenser 15. This gradually causes a reduction in the temperature of the air down to the predetermined temperature where the heating cycle is repeated.

According to the invention, the rate at which the repetitive heating and cooling cycles takes place in the above-described system is changed by providing a by-pass valve 18 which is disposed between gas lines 41 and 22 of the above-described arrangement. As previously indicated, this by-pass valve is a conventional solenoid operated valve and is opened and closed through electrical signals sent to it along wire 46 from switch SW1 in response to temperature conditions of the discharge air as sensed by the thermostat unit through the sensor 28.

By-pass valve 18 is selected to be of such size that, acting in parallel with three-way valve 17, it can pass a desired portion of the hot gas. Operating conditions will dictate the size of the valve used but it has been found the system operates quite satisfactorily if the portion of gas by-passed is in the order of a quarter to a third of the output of the compressor.

The system operates in the following described manner. When the thermostat unit 29 senses that, after a cooling cycle, the temperature of the air being discharged from the evaporator unit 25 has reached a set point temperature of, say 32°, switch SW1 acting on command from the thermostat unit signals the by-pass valve 18 to an open position so that a portion of the hot gas flowing in the line 41 is bypassed around the three-way valve 17 to the evaporator unit 25. During this by-pass of the hot gas the three-way valve 17 is retained by switch SW2 in a position to send hot gas through line 44 to the condenser 15 and to maintain the typical cooling cycle of the refrigeration apparatus.

By diverting part of the hot gas through the by-pass valve 18, while the apparatus is still operating on a cooling cycle, there is a mixture of the hot gas and the refrigerant in the evaporator 25. This, of course, tends to reduce the rate at which the air being cooled at the evaporator drops from the set point temperature down to that predetermined temperature below the set point at which latter point the three-way valve is operated by switch SW2 to initiate a heating cycle at the evaporator. During the heating cycle when the air is heated from the predetermined temperature below set point to the set point temperature, both three-way valve 17 and by-pass valve 18 are in a position to send hot gas directly to the evaporator 25. When the air temperature has been raised to the set point, switch SW1 remains closed to keep by-pass valve 18 open for delivery of hot gas directly to the evaporator but switch SW2 is open so that the three-way valve goes to a cooling cycle position where the gas passes directly to the condenser 15 and on to the evaporator.

When the cooling cycle is again initiated it necessarily takes an appreciable period of time to displace the hot gases from the evaporator and achieve a desired cooling of the air passing through the evaporator. Consequently, as in conventional apparatus, the temperature of the air tends to keep rising for a period of time during the conversion to the cooling cycle. However, because of the tempering effect of continued hot gas delivery through the by-pass valve 18 during this transition period, the rate of cooling is reduced in a manner as described above.

At a predetermined temperature above the set point temperature for the air, switch SW1 opens and the by-pass valve 18 moves to a closed position and the apparatus operates at a full cooling cycle. This drops the temperature passing through the evaporator down toward the set point temperature at which temperature by-pass valve 18 again becomes effective and the cycles, as described above, are successively repeated during operation of the apparatus.

It will be understood that the above description of the present invention is susceptible to various modifications, changes and adaptations, and the same are intended to be comprehended within the meaning and range of equivalents of the appended claims.

I claim:

1. In refrigeration apparatus which produces a cooling cycle according to the vapor-compression cycle and which delivers air, that is selectively cooled or heated in an evaporator of the apparatus, to a loading space, a compressor delivery hot gas to a three-way valve which is selectively operable between two positions, the valve in a first position permitting a flow of hot gas to a condenser and on to the evaporator for a cooling cycle and in a second position permitting the hot gas to flow directly to the evaporator for a heating cycle, the three-way valve being under the control of a thermostat unit sensing the temperature of the air being delivered to the loading space and operating to achieve a set point temperature of the air by controlling the three-way valve to produce alternating cooling and heating cycles, the improvement which comprises:

a. Valve means operatively connected between the evaporator and compressor;
   b. Actuating means for selectively opening and closing said valve means, said valve means in an open position permitting a flow, to the evaporator, of a portion of the hot gas delivered from the compressor during both heating and cooling cycles of the apparatus; and
   c. means in the thermostat unit operatively connected to said actuating means for urging said valve means to an open position only during the time the thermostat unit senses delivered air temperatures which are within a range of temperatures lying between a predetermined temperature which is above the set point temperature, as set at the thermostat unit, and a predetermined temperature below this set point temperature.

2. An arrangement as defined in claim 1, wherein said actuating means is a solenoid.

3. An arrangement as defined in claim 1, wherein said means in the thermostat unit is an electromechanical switch.

4. An arrangement as defined in claim 1, wherein the range of temperatures lies between 2° above the set point temperature and 2° below this temperature.

5. In a refrigeration apparatus carried on a vehicle and including a blower for selectively delivering cooled or heated air to a loading space in the vehicle, the apparatus including a compressor for supplying hot gas to a solenoid operated three-way valve which is selectively operable between two positions, the valve in a first position permitting a flow of hot gas to a condenser, and on through a receiver, and an expansion valve to an evaporator for cooling the air, and in a second position permitting the hot gas to flow directly to the evaporator for heating the air, a return line for gas from the evaporator to the compressor, the blower being disposed to force air through the evaporator and into the bottom of the loading space and to recirculate the air discharged from the top of the loading space, and a thermostat unit having a sensor disposed downstream of the evaporator in the path of circulating air, the thermostat unit operating to achieve a set point temperature of the air and including an electrical switch operatively connected to the solenoid of the three-way valve to move the valve between its first and second positions in response to the temperature of the air moving past the sensor, the improvement comprising:

a. A valve operatively connected between the compressor and the evaporator;

b. Actuating means for moving said valve between open and closed positions, said valve in an open position permitting a portion of the hot gas delivered by the compressor to flow directly to the evaporator during both heating and cooling cycles in the apparatus; and
c. control means in the thermostat unit operatively connected to said actuating means for opening said valve to permit a flow of hot gas to the evaporator only during that period of time in which the temperature of the air moving past the sensor lies in a range between a predetermined temperature lying above the set point temperature, and a predetermined temperature below this set point temperature.

* * * * *